R. B. CAVERLY & A. B. BELL.
GAS RANGE.
APPLICATION FILED DEC. 1, 1914.

1,159,896.

Patented Nov. 9, 1915.
6 SHEETS—SHEET 1.

WITNESSES:
Dyer Smith
Frank H. Oraken

INVENTORS
Robert B. Caverly
Alfred B. Bell
BY
J. C. Edmonds
ATTORNEY

R. B. CAVERLY & A. B. BELL.
GAS RANGE.
APPLICATION FILED DEC. 1, 1914.

1,159,896.

Patented Nov. 9, 1915.
6 SHEETS—SHEET 5

Fig. 9.

WITNESSES:

INVENTORS
Robert B. Caverly
Alfred B. Bell
BY
ATTORNEY

UNITED STATES PATENT OFFICE.

ROBERT B. CAVERLY AND ALFRED B. BELL, OF PHILADELPHIA, PENNSYLVANIA, ASSIGNORS TO HALE AND KILBURN COMPANY, OF PHILADELPHIA, PENNSYLVANIA, A CORPORATION OF DELAWARE.

GAS-RANGE.

1,159,896.     Specification of Letters Patent.     Patented Nov. 9, 1915.

Application filed December 1, 1914. Serial No. 874,961.

*To all whom it may concern:*

Be it known that we, ROBERT B. CAVERLY and ALFRED B. BELL, citizens of the United States, residing at Philadelphia, in the county of Philadelphia and State of Pennsylvania, have invented certain new and useful Improvements in Gas-Ranges, of which the following is a specification.

Our invention relates to gas ranges and particularly to constructions comprising various units which can be removably connected together and so arranged that various types of range may be provided without the use of additional parts, or with the addition of only a few parts. Thus, our invention may provide a sheet-metal gas range of the low cabinet type comprising units which are interchangeable so that the construction may be made either what is termed a right hand range or a left hand range without additional parts, and which, by a few changes in the arrangement of the gas supply pipe, and the substitution of four short legs in place of the four long removable legs which are provided with the low cabinet type of range, may be made into a double oven type of range, the parts left over being adapted to form a table if desired by the addition of a support and a table top.

Our invention also comprises various details of construction in gas ranges formed chiefly of sheet-metal, these structural details being directed to the provision of improved and efficient ranges and parts thereof and also to the arrangement of parts such that the various units referred to may readily be made interchangeable.

The objects of our invention are accordingly the provision of efficient, strong and comparatively inexpensive constructions of the character referred to.

Under various conditions, it has heretofore been necessary for merchants to carry in stock various types of gas ranges. In accordance with our invention, a merchant may be provided with one range which, by a simple rearrangement of the parts, may be converted into any one of three or more types. Our invention also enables a householder to place a range in a different location from that originally intended, if this becomes desirable because of decrease in the space to be occupied by the range, or if the space is changed because of alterations, or if for other reasons a different type of range is found to be preferable to the one originally installed. These various conditions are taken care of by our invention without extra cost, except for the labor necessary to interchange the parts, and the latter may be readily accomplished at the place of installation of the range.

Our invention may be briefly described as comprising a base-frame secured to four sheet-metal legs, a baking and a broiling oven arranged one above the other in a unitary reinforced sheet-metal construction, a sheet-metal warming oven unit and a burner-box unit, together with a splash back and top shelf and other necessary or desirable parts. The double oven unit may be bolted in position within the left hand end of the base-frame with the warming oven and burner-box above the same similarly secured in place within the right hand end of the base-frame, the gas connections being suitably arranged and the splash back and top shelf, if desired, being secured in place. Or the parts may be reversed, the oven unit being bolted in place within the right hand end of the base-frame and the warming oven and burner-box being secured in position on the left hand end of the frame. Or the warming oven may be omitted and the burner-box with its top grate positioned at either end of the frame, the oven unit occupying the other end of the frame, the gas piping being suitably arranged to meet this condition. Or the various units referred to may be removed from the base-frame, the burner-box and top grate mounted on top of the double oven unit, and the latter secured upon four short legs which may be provided, the parts left over being adapted, as stated, if desired, to form a table with the addition of a few extra parts. In addition to the arrangements permitting interchangeability of parts, our invention also provides improved constructional features of gas ovens, doors, insulations, linings, arrangement of burners, and other parts, as will be hereinafter more fully described.

In order that a clearer understanding of our invention may be had, attention is hereby directed to the accompanying drawings, forming part of this application and illustrating certain embodiments of our invention.

Referring to the drawings, the base-frame 1 is formed of standard angle iron bent into rectangular form, the frame being notched to permit it to be bent and being preferably oxy-acetylene welded at the joints. This frame comprises a horizontal inwardly directed flange 2 extending around the same and a vertical flange 3, as is shown in the lower view of Fig. 9. The four legs 4 are preferably formed from sheet-metal with a flange turned in at the bottom of each, as shown at 5, to permit easy moving, the legs having vertical side flanges such as 6 and 7 shown in the lower view of Fig. 9, these sides of the legs being turned in at the top to form a horizontal flange 10. A pressed metal angle 11 having a horizontal flange 12 is electrically welded to the top flange 10 of each leg. The legs are drilled for bolts which pass through the vertical flanges of angle pieces 11, the vertical flanges of base-frame 1, and into the bottom member of the double oven unit and the warming oven or pan unit, as will be described. Such bolts are illustrated at 13.

The supporting frame and leg members described above comprise the subject-matter of our divisional application, Serial No. 16583, filed March 24, 1915, entitled "Supports for gas ranges."

Figures 3, 7, 8:
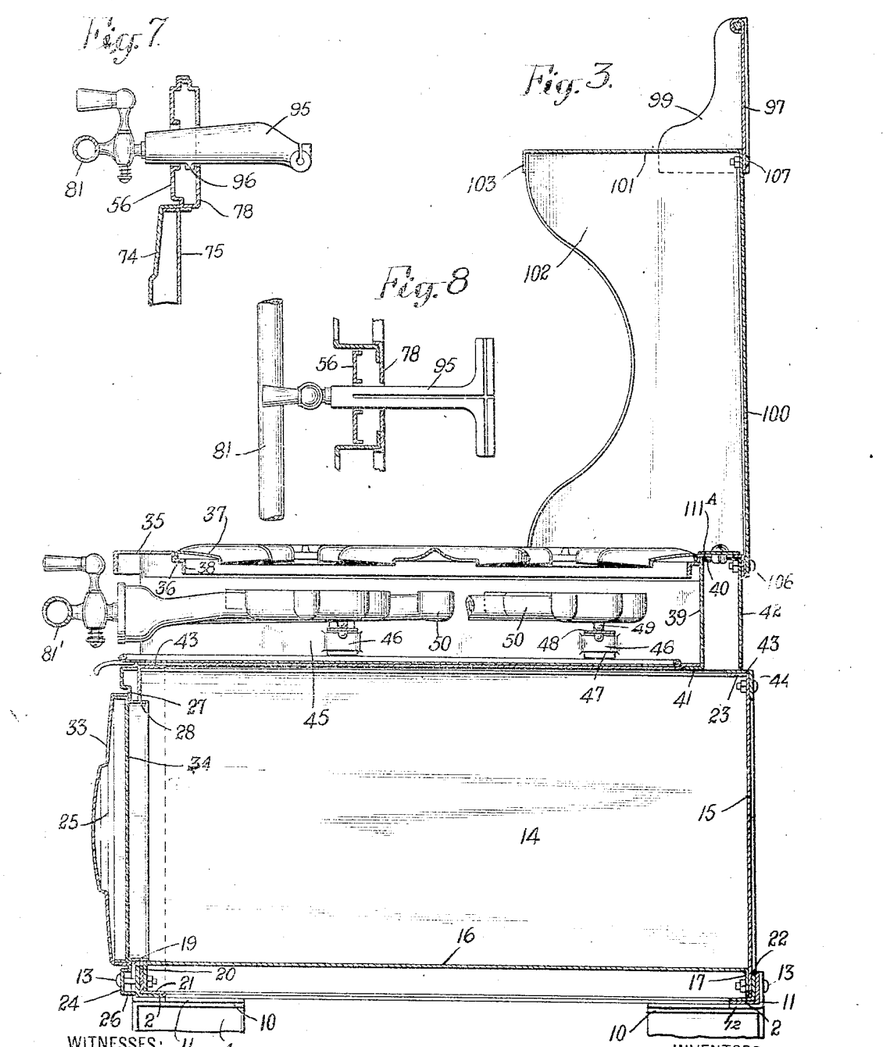
Fig. 3 is a vertical section on line 3—3 of Fig. 1.
Fig. 7 is an enlarged vertical sectional detail showing the manner of supporting a pilot burner.
Fig. 8 is a horizontal sectional view corresponding to Fig. 7.
Figures 6, 10, 11:
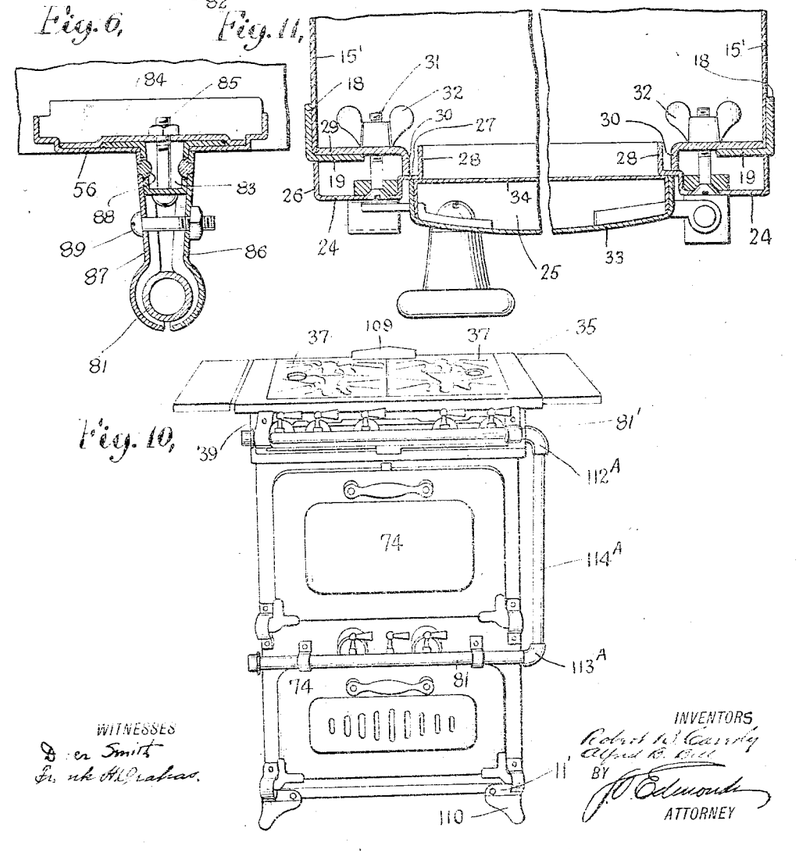
Fig. 6 is an enlarged sectional detail illustrating a clamping post for a feed pipe bracket.
Fig. 10 is a perspective view from the front of the parts combined into a double oven type of range.
Fig. 11 is a horizontal section on line 11—11 of Fig. 1.
Figure 9:
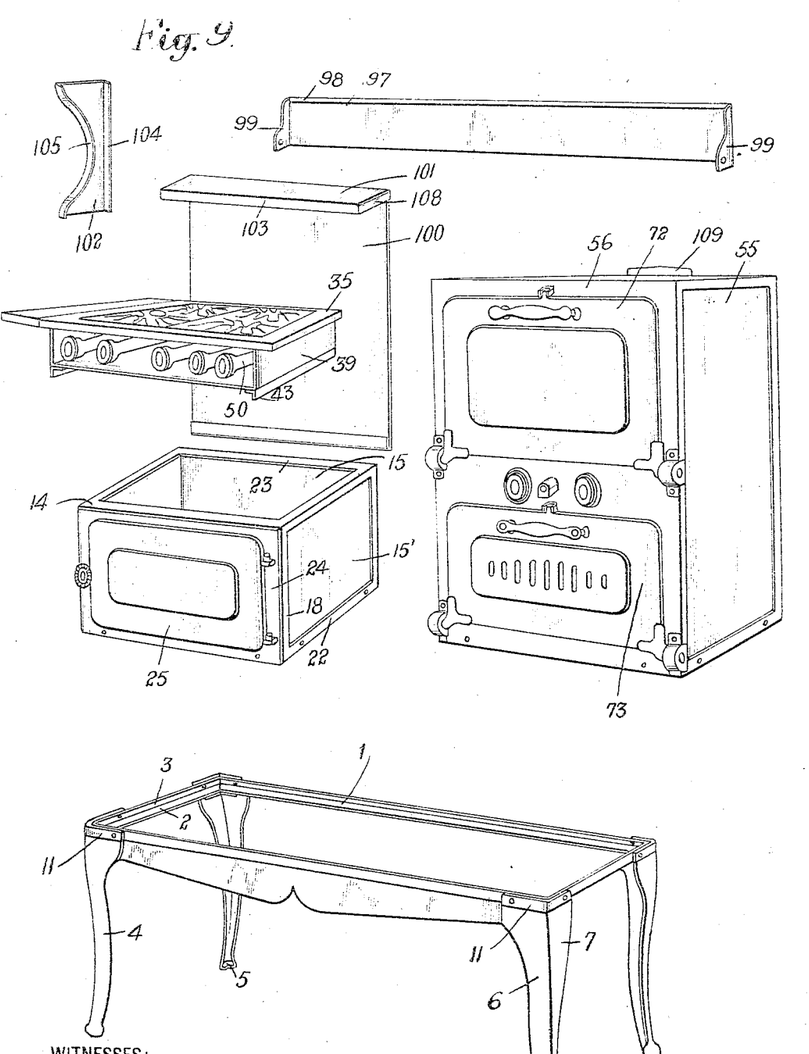
Fig. 9 is a perspective view of various of the interchangeable units and parts shown separated.

The warming oven 14, as illustrated in Figs. 3 and 9, is formed by bending a sheet of sheet-metal to form an inclosure around three sides, namely, the back 15 and the two adjacent sides 15'. A bottom 16 is formed of sheet-metal, this being notched and having vertical flanges 17 turned downward on all four sides for stiffness, these flanges 17 being welded or otherwise secured to the back 15 and sides 15' adjacent the lower edges of the same. A frame of angle iron is secured around the edges of the inclosure thus made, being electric welded or bolted thereto. The angle frame on each side may be formed from one piece of metal by notching and bending it. The angle at the front of the inclosure has vertical flanges 18 extending rearwardly from the front edges of sides 15' and vertical flanges 19 extending parallel to the back 15 of the inclosure, as shown in Fig. 11; the bottom front edge of the box has secured thereto an angle having a vertical flange 20, secured to the flange 17 of the bottom, and a rearwardly directed horizontal flange 21, and the sides and the back of the box are provided with similar angle frames, as shown at 22 in Figs. 3 and 9. The angle frame thus formed at the bottom of the warming oven unit is adapted to be bolted as stated to the vertical flanges 3 of the base-frame 1 by bolts 13, at either end of the base-frame. The sides and rear 15' and 15 of the sheet-metal frame are bent over at the top to form a horizontal flange 23 to form a support for the burner-box unit to be described hereinafter.

The door frame 24, in which door 25 is pivoted is preferably removably secured to the front of the warming oven. The door-frame 24 consists of a pressed metal frame having an outside horizontal flange 26 adapted to abut against the front edge of flange 19 of the angle secured to the front of the warming oven, an offset 27 forming a seat for the door and an inside flange 28, as shown in Figs. 3 and 11. Angular clamping clips 29 are inserted behind the front flanges 19 of the angles on the front of the warming oven, the forwardly directed flanges 30 of these clips contacting the offset portion 27 of the door-frame. The frame is drilled at two points for screws 31, which extend through clamping clips 29 and may be secured by thumb-nuts 32 thus making it possible to easily detach the door by loosening these thumb-nuts and turning the clips to a vertical position when the door and frame come free. The door 25 is made up of a formed pan 33 with a pan 34 inside the same with its flanges welded or otherwise secured to the flanges of the outside member of the door, the inside member 34 acting as a lining and forming an insulating air space. The door is attached to the frame by any suitable hinges of the pivot type or the drop type.

The burner-box unit, which in the low cabinet type of range illustrated is mounted upon the warming oven unit, consists of a pressed steel top frame 35 which has vertical flanges extending downward all around the outside of the same, an offset 36 on which the top grate 37 is adapted to rest, and a vertical flange 38 extending downward around the inside. To this top frame is welded the outer sheet 39 of the burner-box, which is made by forming sheet-metal into a three sided inclosure having outwardly projecting flanges 40 at the top and inwardly directed flanges 41 at the bottom. The burner-box has a space at the back occupied by a sheet-metal box 42 open at top and bottom and having flanges welded to the back of the burner-box. A hole is pierced in the top frame 35 above this box 42 to a size suitable for a flue collar, thus making an opening through the burner-box by means of the box 42 and the opening referred to in top frame 35. An angle frame 43, similar to the angle frame described in connection with the warming oven, is electric welded or bolted to the frame of the burner-box. The burner-box unit thus formed may be bolted to the top of the warming oven unit by bolts 44 passing through the angle frame 43 of the burner-box, or may be otherwise removably secured on top of the warming oven. Within the burner-box is a lining 45 preferably formed of galvanized iron formed into a three sided box with a bottom, by notching the two corners of a sheet and turning up vertical flanges. The lining slips into the burner-box at the front between the frame thereof and the cooking top 35 and may be held in place by stove bolts. Small pockets 46 are pressed into the sides of the burner-box lining to hold tongues 47 which are bent down at the ends of angle-shaped burner supports 48, which have vertical holes therein to receive the tapered lugs 49 on the cast iron burners 50, thereby locating the same vertically and horizontally. The details of the burner-box construction are not claimed herein, but are described and claimed in an application of Alfred B. Bell, entitled Burner-boxes for gas ranges, Serial No. 874,968, filed December 1, 1914.

Figure 4:
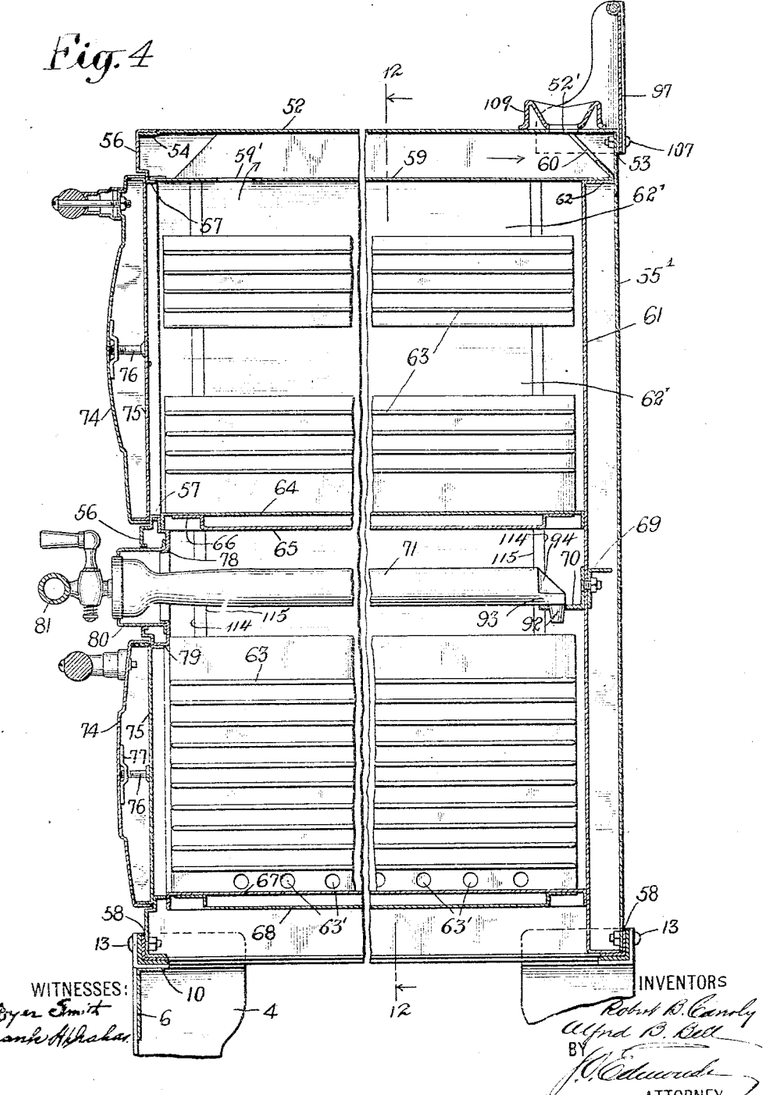
Fig. 4 is a vertical section on line 4—4 of Fig. 1.

The double oven unit 51, as shown particularly in Figs. 4 and 9, is a somewhat similar construction to the warming oven or shelf described above. It is provided with a top sheet 52 formed from a sheet of metal and having flanges 53 turned downward around three sides and having its front edge offset or bent downwardly slightly as shown at 54, to permit it to slip under the flange of the oven front. The oven body 55 is formed of sheet metal pressed into a three sided inclosure forming the two sides and back 55' of the oven. To this body is electric welded or bolted the top 52 and also the oven front 56 which is a frame having flanges turned inward around the outside edges, opening for doors with offsets to locate the same, and flanges 57 turned inward around these openings. Holes are pierced for the burners and gas rail support posts and for observation of burners. The oven top is provided with a flue hole at the back, as shown in Fig. 4 at 52', the flue collar 109, later referred to, being mounted over this hole, as shown in Figs. 4 and 9. To this oven front and body is electric welded or bolted an angle iron base-frame 58 similar to the angle iron base-frames previously described as secured to the bottoms of the warming oven unit and the burner-box unit. The oven unit may be secured in position at either end of base-frame 1 by means of bolts or screws 13 extending through the flanges of angles 11 on the legs, the vertical flanges of base-frame 1 and the bottom angle frame 58 of the oven unit. This oven unit is provided with various lining members. A top lining 59 is provided with upwardly directed flanges such as is shown at 60, thereby forming an air space in the top of the oven. This is provided with holes 59' at the front to permit cooking vapors and air to escape by way of the flue. A back lining 61 is similarly formed by notching the same at the corners and providing horizontal flanges 62, an air space thereby being formed at the back of the oven to serve as insulation and also to act as a flue, flange 60 having an opening therethrough for the escape of vapors from the space between members 52 and 59 through flue hole 52'. The top lining 59 rests on the top flange of the rear lining and on the horizontal flange 57 of the oven front 56. The side linings 111 are each formed in one piece and are provided with flanges 111' similar to those, 62, of back lining described above. The central portion of each side lining of the top oven is provided with a rectangular recess, as shown at 62', by forming the side linings at this point in a channel shape, thereby forming an air space for insulation of the side walls. Sheet-metal pieces 63 formed in spaced U-shapes are electric welded to the flat portions of the side linings, thereby forming passages for air while the U-shapes act as rack supports. In the broiling or lower oven, holes 63' are pierced to allow air to enter for the burners, and the U-shapes are continuous allowing a great many positions for the burner pan which rests thereon.

Figure 12:
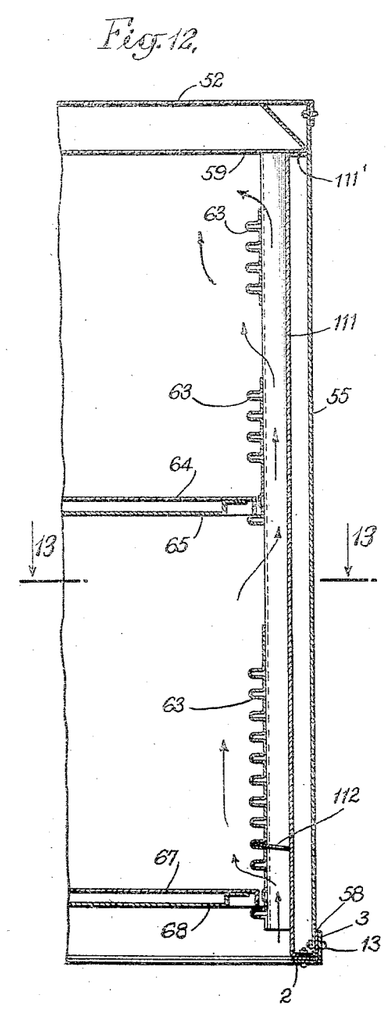
Fig. 12 is a partial vertical section on line 12—12 of Fig. 4, through one of the side linings and adjacent parts.

The upper oven is provided with a bottom 64 made of a sheet of metal notched and flanged downward, a second sheet of metal 65 notched and having an offset formed around its sides being also used, the horizontal flanges 66 of this member being welded to the upper member 64 of the bottom, an air space thus being formed in the bottom for insulation. The bottom of the lower oven is similarly formed of a top member 67 and a lower member 68 welded thereto. Asbestos may be put in the air space in the bottom of the baking or upper oven to act as additional insulation. The bottoms of the two ovens as described rest on the lower U-shapes of the rack supports in the two ovens as shown in Fig. 12. Sheet-metal angles, such as 69, are preferably welded to the back and top linings to give stiffness, and a sheet-metal angle 70 having holes pierced in its horizontal flange is bolted to the back lining as a support for the oven burners 71. The linings described are interlocking, the top lining being supported by the two side linings and the back lining. The back lining rests behind the ends of the side linings and the latter are held in place by the oven bottoms. The side linings are interchangeable and all linings are readily removed. The broiler or lower oven racks may have baffle plates 112 just above the holes 63' at the bottom to deflect incoming air into the oven to be heated by the burners. The rack supports in the baking or upper oven are in two parts, as shown in Figs. 4 and 12.

Figure 13:
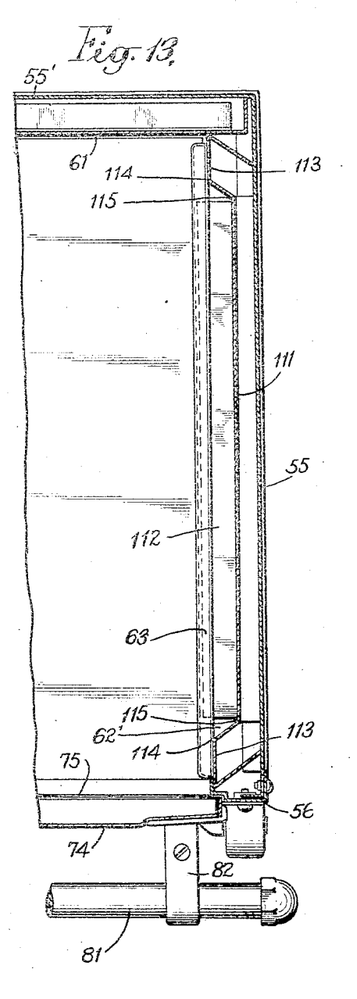
Fig. 13 is a horizontal section on line 13—13 of Fig. 12.

The arrangement of the side linings and baffle plates, and circulation of air, may be seen particularly in Figs. 4, 12 and 13. The channeled construction of each side lining, referred to, is particularly shown in Fig. 13, in which each side lining 111 is seen to have inwardly extending box-like end portions 113, the lines 114 and 115, on which the metal of the same is bent, being seen in Figs. 13 and 4. The rack-supports 63 being secured across the end portions 113 of the side linings form the recesses or openings 62' referred to, through which air enters the upper oven. The baffle plates 112, above holes 63' in the lower oven, extend between side linings 111, between the end portions thereof, and rack supports 63, and conveniently are held by each having its inner end inserted in one of the U-shapes of the adjacent rack support, as shown in Fig. 12. The circulation of air is shown by the arrows in Figs. 12 and 4. The air rises between the side lining and rack support on each side, and is deflected by baffles 112 through holes 63' into the broiling oven. It rises and is heated by the burners 71 and passes around the baking oven bottom 64 through the central channel opening of the side lining at each side, the oven bottom resting on U-shapes of the rack supports as stated. It enters the baking oven through the openings 62' between the rack supports, and leaves the baking oven through holes 59' in the front of top lining 59. Thence it passes back between members 59 and 52, and escapes through the hole in flange 62 to the flue hole 52', and out through the flue collar. In addition to heat derived from this circulation, the baking oven obtains some heat by radiation from oven bottom 64.

Two drop or swing doors are fastened to the oven front in line with the upper and lower ovens, these doors being illustrated at 72 and 73. Each door comprises a sheet-metal pan 74 having an inside pan 75 secured thereto to act as a lining and form an air space for insulation. These inside pans are fastened to the outer pans or plates 75 by means of screws 76 tapped into reinforcing plates 77 which may be electric welded to the outside pan in each instance.

Figure 5:
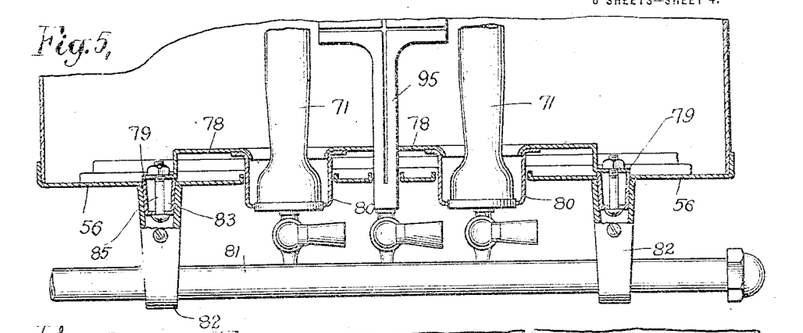
Fig. 5 is a horizontal section on line 5—5 of Fig. 1.

The construction of the oven front is shown in Figs. 4 and 5. A heat deflector or insulation member is fastened to the oven front 56 between the two doors, this comprising a sheet of metal 78 which is notched at the corners and formed into a pan with flanges 79 at the ends. It has holes pierced therein for burner cups 80 which are made of drawn sheet-metal electric welded to member 78 along curved flanges formed on the cups and the member 78. Member 78 may be held in position by electric welding its flanges 79 to the oven front 56 or by bolts extending through the oven gas rail support post, as will be described. Member 78 acts as a lining for the oven front at this point, as a heat insulator, and as a means for allowing the oven burners 71 to pass through the oven front without affecting the dead air space formed by this lining 78.

The gas rail or feed pipe 81 may be supported by means of a pair of posts 82 as illustrated particularly in Figs. 5 and 6. The posts 83 are each formed by bending a sheet-metal blank into a box-shaped section, the flanges 84 extending outward and welded or otherwise secured to the oven front 56. As stated, the heat deflector or lining 78 may be mounted in position by bolts 85 extending through these posts 83. To the posts 83 are attached the brackets or supports 82 for the gas feed pipe 81. These brackets are each formed of a pair of formed pieces of steel 86 and 87 which have vertical stiffening flanges and are formed at their ends to fit the pipe 81. Each of these members 86 and 87 is provided with a lug 88 fastened to it or formed in it, these lugs fitting into correspondingly shaped recesses in the outer surfaces of posts 83 to properly aline the halves 86 and 87 of the bracket. A clamping screw 89 extends through the two members of each bracket thus positioned to hold the same together in position. The oven manifold support thus described is a cheaper and stronger article than those previously used of cast iron, and being die blanked and formed, it is very accurate as to dimensions and shape. The gas feed pipe in front of the burner-box may be similarly supported.

Figure 1:
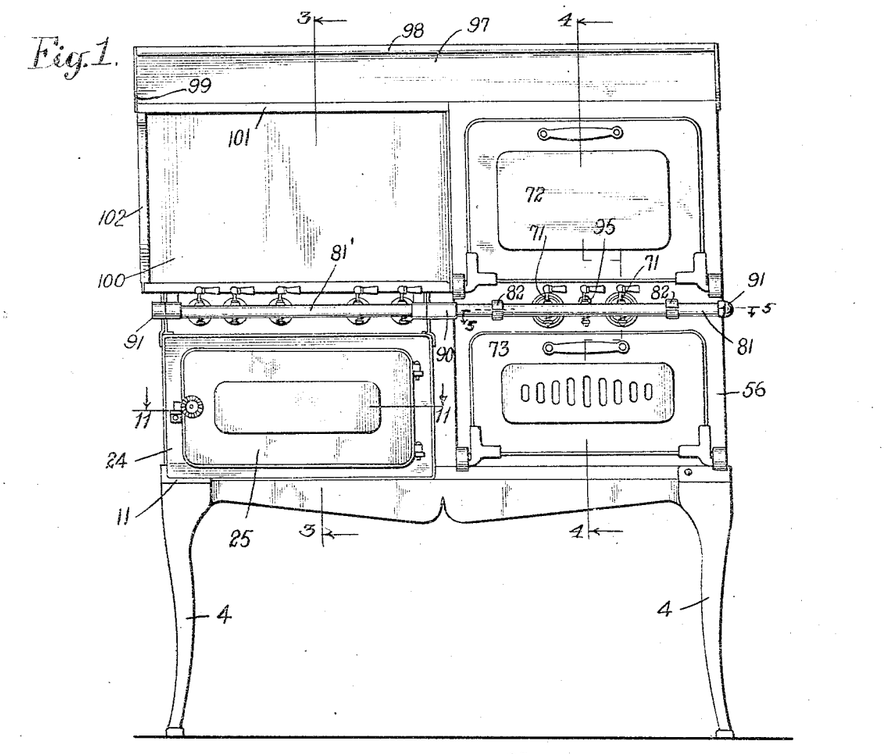
Figure 1 represents a front elevation of a low cabinet type of gas range with the double oven unit on the right and the warming oven and burner-box on the left.
Figure 2:
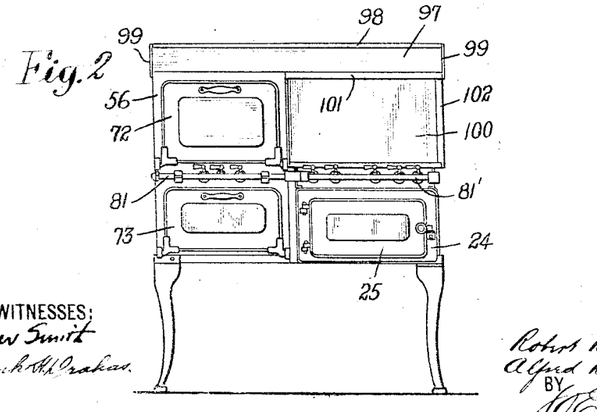
Fig. 2 is a similar view showing the rearrangement of the parts with the oven unit on the left and the warming oven and burner-box on the right.

The gas piping as shown in Figs. 1 and 2 is formed in a straight line comprising the pipe 81 which is supported as stated in brackets 82 in front of the double oven unit and pipe 81' supported in front of the burner-box unit on top of the warming oven unit, these pipes being connected at the center by a T connection 90 to which the feed pipe may be attached, this extending through the space between the burner-box and the oven unit. Pipes 81, 81′ have caps 91 on each end and are drilled and tapped at intervals for the burner tops which extend into openings in the burners. The oven burners 71 are supported as stated by a steel angle 70 bolted to the back lining 61 of the oven unit, holes being pierced through the horizontal flange of the angle to receive the tapered lugs 92 on burners 71. The burner support thus described is cheaper than previous styles of burner support with which we are familiar, and serves the function of properly locating the oven burners. Burners 71 are of cast iron construction with tapered lugs 92 projecting downwardly from the rear ends of the same as stated, horizontal flanges 93 being provided on each side of the base of each burner to prevent rocking, a tapered portion 94 being provided on the upper side of the burner above the flanges 93 to the top of the burner, these provisions making wrong applications of the burners impossible. The burners are of pipe shape cored and drilled as usual with air mixer covers. The construction described is such that the burners cannot by any possibility be wrongly positioned, are readily applied or replaced and cannot be broken under most severe working conditions. The top burners 50 as stated above are positioned by dropping lugs 49 on the same into the burner supports 48 which have end flanges removably positioned in the pockets 46 of the lining 45 of the burner-box unit. The pilot burner 95 of the oven is detachable and consists of a simple cored T-shaped casting with openings such as a saw-cut along the upright and cross-bar of the T. A lug 96 is cast on the under side of the inwardly extending portion of the burner, so that when the burner is inserted in its hole in the oven front in a horizontal position and dropped down into position, this lug 96 falls into the space between the oven front 56 and the heat deflector or lining member 78, lug 96 holding the burner in position by catching against the edge of plate 78. This is an improvement over previous types of pilot burner with which we are familiar, most of which are bolted in place with the disadvantage that the bolts rust so that the same cannot be readily removed. The removable types of pilot burner all have cumbersome lugs or extensions bolted to them. The pilot burner described may be quickly removed, and has no projections or extensions to break off.

If desired, a reversible splash back and shelf may be applied to the low cabinet type of range described. This consists of a sheet metal shelf back 97 extending the length of the range with its top edge 98 curled for stiffness and stiffening angles 99 electric welded to the end of the back. A splash back 100 is provided with this construction having a top shelf portion 101 bent forwardly at right angles thereto, a symmetrically formed end support 102 being provided for shelf 101. For an interchangeable construction, this end support 102 is made separate from the shelf back 100 and is bolted thereto at one end, the forward edge of shelf 101 being provided with a downwardly directed flange 103 and the end support 102 being provided with inwardly directed flanges 104 and 105 whereby the support 102 may be bolted to the shelf 101 and back 100. The back 100 is positioned to the rear of the warming oven and burner-box and above the same and is removable secured in place by bolts 106 securing the lower edge of back 100 to the top member 35 of the burner-box. The shelf back 97 is secured by bolts 107 extending through the end flanges 99 of the shelf back into the vertical flanges of the top 52 of the oven unit, the opposite end flange 99 of the shelf back 97 being bolted to the end flange 108 of shelf 101. The end support 102 for shelf 101 rests on the top plate 35 of the burner-box. A pressed metal flue collar 109 is fastened in position about the opening in the top of the oven of the low cabinet type as shown in Fig. 9.

The range is shown in Fig. 1 with the oven unit mounted on the right and the warming oven, burner-box and splash back 100 mounted at the left, these parts being shown in reversed position in Fig. 2, the interchange being effected by simply unbolting the units from the base-frame 1 and again securing them in place in reversed position, the piping 81, 81′ being, of course, disconnected and again connected in the new position. It will be noted that end support 102 for shelf 103 is formed symmetrically so that it can be reversed and mounted in position at either the right or left hand side of the range as shown. The range may also be transformed into a double oven type, as shown in Fig. 10, by removing the units from the base-frame 1 and securing the short legs 110, which are supplied as additional parts, to the bottom of the double oven unit. These short legs are similar in construction to the legs 4 previously described and have angle pieces 11′ secured to the top flanges of the legs, bolts extending through angles 11′ into the angle base-frame of the double oven unit to secure the short legs in position. The burner-box unit is also placed in position on top of the oven unit, the flue collar 109 being removed from the top of the oven unit and positioned on the opening at the back of cooking top frame 35 of the burner-box, in place of the flue cover 111$^A$ which, as shown in Fig. 3, is removably secured on top of the box 42 at the rear of the burner-box unit, in the low cabinet type of range. To complete the construction of the double oven range, it is only necessary to connect the feed pipes 81 and 81' of the oven unit and the burner-box respectively by L connections 112^A and 113^A, a riser pipe 114^A between the same and a side outlet connection. As stated, the base-frame 1, together with legs 4 and the warming oven 14 are left over when the double oven shown in Fig. 10 is made and these parts may be converted into a table by the addition of suitable parts not shown, to connect with the warming oven unit left on the base-frame, a table top being mounted above the same. The shelf back 97, splash back 100, and end support 102, are also left over when the double oven is made. It is obvious that a right or left hand range, as shown in Figs. 1 and 2, may also be constructed with the omission of the warming oven unit 14 if this is not desired, the burner-box unit then resting on base-frame 1 directly in place of the warming oven unit and pipes 81 and 81' being suitably connected.

Having now described our invention, what we claim as new therein and desire to secure by Letters Patent is as follows:—

1. In gas ranges, the combination of a rectangular base-frame, having vertical and horizontal flanges, a double-oven unit, a burner-box unit, and means for removably securing said units in position on the horizontal flange and within the vertical flange of said frame, said units and securing means being arranged to be interchangeably mounted at either end of said frame, substantially as set forth.

2. In gas ranges, the combination of a rectangular base-frame, having vertical and horizontal flanges, a double-oven unit, a burner-box unit, a warming-oven unit, and means for removably securing said oven-units in position on the horizontal flange and within the vertical flange of said frame and said burner-box unit upon said warming-oven unit, said units and securing means being arranged to be interchangeably mounted at either end of said frame, substantially as set forth.

3. In gas ranges, the combination of a rectangular base-frame, having vertical and horizontal flanges, a pair of units, comprising an oven and a second unit, each formed of sheet-metal with a rigid bottom flanged member, said units being adapted to be positioned on said base-frame at the ends thereof, or in reversed position, means for securing the same in either position, burners and gas-piping therefor, said piping being arranged to be connected to a source of gas supply in either position, substantially as set forth.

4. In gas ranges, the combination of a base frame, a double-oven unit, containing a pair of vertically-arranged ovens, burners mounted between said ovens, and a horizontal gas manifold mounted on the front of said unit and connected to said burners, a warming oven unit, and a burner-box unit, having a cooking top frame, burners beneath said frame, and a horizontal gas manifold mounted on the front of said burner-box unit and connected to the burners therein; said double oven unit being adapted to be secured on said frame, and said warming oven unit on said frame, at either side of said double oven unit, with said burner-box unit on said warming oven unit and said manifolds connected together in straight line connection; said burner-box unit also being adapted to rest on said double oven unit, with said manifolds connected by a vertical riser, substantially as set forth.

5. In gas ranges, the combination of a base-frame, a pair of sheet-metal and angle-frame units, adapted to be positioned interchangeably on either end of said frame, one unit comprising a pair of vertically arranged ovens and the other a burner-box, a sheet-metal back and shelf, adapted to be positioned to the rear of and above said burner-box, said back and shelf being of a length only slightly greater than said burner-box, and having their rear surfaces in substantial alinement with the rear surface of said double oven unit, means for securing said units in position at either end of said frame, and a symmetrically formed end support for said shelf, adapted to be positioned above said burner-box in either position of the latter, substantially as set forth.

6. In gas ranges, the combination with a sheet-metal oven having a front frame pierced for burners, and burners extending through the same, of drawn sheet-metal burner-cups extending through said burner-holes, and a flanged sheet-metal heat-deflector secured to said oven front and spaced therefrom, and having burner-holes therein through which said burners extend, said burner cups being secured by flanges thereon to said deflector, substantially as set forth.

7. In gas ranges, a sheet-metal oven having a back and two sides formed of pressed metal, an angle-frame secured to the side and front edges of the frame so formed with flanges at the front side edges extending into the opening parallel to the back, a removable front frame having a door opening therein and an offset edge portion having an inturned edge flange contacting the front flanges of said angle-frame, angular clamping clips, having flanges extending behind said front flanges of the angle-frame, and having flanges contacting said front frame, and removable securing means extending through said clamping clips and said front frame, substantially as set forth.

8. In gas ranges, the combination of a metal frame-member, a sheet-metal post secured to and extending outwardly from said frame-member, and having recesses in its two sides, a gas-pipe, and means for securing said pipe to said post, comprising upper and lower sheet-metal supports, each having a lug positioned in one of said recesses, and having ends formed to embrace said pipe, and means for clamping said supports together, substantially as set forth.

This specification signed and witnessed this 30th day of November, 1914.

ROBERT B. CAVERLY.
ALFRED B. BELL.

Witnesses:
WM. J. EARNSHAW,
WILLIAM J. CONWAY.